United States Patent
Mitchell et al.

(10) Patent No.: US 12,294,570 B2
(45) Date of Patent: May 6, 2025

(54) METHODOLOGY FOR BLINDED MESSAGING

(71) Applicant: MyScholar, LLC, St. Louis, MO (US)

(72) Inventors: Bill Mitchell, St. Louis, MO (US);
Blake Ashby, Ferguson, MO (US);
Ryan Niemann, Chesterfield, MO (US)

(73) Assignee: MYSCHOLAR, LLC, St. Louis, MO (US)

(*) Notice: Subject to any disclaimer, the term of this patent is extended or adjusted under 35 U.S.C. 154(b) by 0 days.

(21) Appl. No.: 17/337,255

(22) Filed: Jun. 2, 2021

(65) Prior Publication Data

US 2021/0385197 A1 Dec. 9, 2021

Related U.S. Application Data

(60) Provisional application No. 63/033,718, filed on Jun. 2, 2020.

(51) Int. Cl.
| | |
|---|---|
| *G06F 15/16* | (2006.01) |
| *H04L 9/40* | (2022.01) |
| *H04L 51/04* | (2022.01) |
| *H04L 51/10* | (2022.01) |
| *H04L 51/212* | (2022.01) |
| *H04L 51/214* | (2022.01) |

(52) U.S. Cl.
CPC .......... *H04L 63/0421* (2013.01); *H04L 51/04* (2013.01); *H04L 51/10* (2013.01); *H04L 51/212* (2022.05); *H04L 51/214* (2022.05); *H04L 63/0227* (2013.01)

(58) Field of Classification Search
None
See application file for complete search history.

(56) References Cited

U.S. PATENT DOCUMENTS

| | | |
|---|---|---|
| 6,976,172 B2 | 12/2005 | Girard |
| 8,655,311 B2 | 2/2014 | Shaw |
| 8,934,863 B2 | 1/2015 | Shaw |
| 9,430,671 B2 | 8/2016 | Aghasaryan et al. |
| 10,079,807 B2 | 9/2018 | Parikh et al. |
| 10,666,584 B2 | 5/2020 | Shi |
| 10,776,758 B1* | 9/2020 | Benedict ................ G06Q 50/01 |
| 11,102,179 B2 | 8/2021 | Yanai et al. |
| 11,176,271 B1* | 11/2021 | Garg .................... G06F 21/6254 |

(Continued)

*Primary Examiner* — Yves Dalencourt
(74) *Attorney, Agent, or Firm* — Lewis Rice LLC

(57) ABSTRACT

Systems and methods for "blinded" messaging, wherein, a user can draft and send targeted communications to groups of other users having specific characteristics selected by the sending user, but the identification of the recipients is not provided to the sender. The system also permits the recipients to respond or engage in interact discussion with the sender, again without revealing any personal or identifying information about the recipient in question. This preserves anonymity and protects privacy. The systems and methods may be implemented in the context of a career or educational opportunity on-line services platform, which matches candidates to opportunities such as schools or jobs. Providers of such positions may also create on the platform career pathway profiles that are linked together to create an emergent, organic web of career paths for students and job-seekers to research and browse.

20 Claims, 3 Drawing Sheets

(56) References Cited

U.S. PATENT DOCUMENTS

| | | | |
|---|---|---|---|
| 2003/0182171 A1* | 9/2003 | Vianello | G06Q 10/063112 705/7.14 |
| 2004/0148220 A1* | 7/2004 | Freeman, Jr. | G06Q 10/10 705/7.14 |
| 2004/0229199 A1* | 11/2004 | Ashley | G09B 7/00 434/323 |
| 2005/0233741 A1* | 10/2005 | Zamani | G06Q 30/02 455/432.3 |
| 2008/0027993 A1* | 1/2008 | Andino | G06Q 10/1053 |
| 2013/0080314 A1* | 3/2013 | Powell | G06Q 30/02 706/46 |
| 2013/0246294 A1* | 9/2013 | Pendyala | G06Q 10/1053 705/321 |
| 2014/0205987 A1* | 7/2014 | Habermehl | G09B 7/02 434/350 |
| 2014/0214711 A1* | 7/2014 | Filstein | G06Q 10/06 705/321 |
| 2015/0039525 A1* | 2/2015 | Frazier | G06Q 10/105 705/319 |
| 2015/0178682 A1* | 6/2015 | Matthews | G06Q 10/1053 705/321 |
| 2015/0337398 A1* | 11/2015 | Wang | C12Q 1/701 506/3 |
| 2017/0004722 A1* | 1/2017 | Dragos | G09B 7/06 |
| 2017/0109448 A1* | 4/2017 | Adamy | G06F 16/24578 |
| 2017/0116576 A1 | 4/2017 | Chernyak | |
| 2017/0337398 A1* | 11/2017 | Braun | G06F 21/6254 |
| 2018/0308062 A1* | 10/2018 | Quitmeyer | G06Q 10/1053 |
| 2019/0332807 A1* | 10/2019 | LaFever | H04L 63/0407 |
| 2020/0302368 A1* | 9/2020 | Mathiesen | G06N 5/041 |

* cited by examiner

METHODOLOGY FOR BLINDED MESSAGING

CROSS-REFERENCE TO RELATED APPLICATIONS

This application claims the benefit of U.S. Prov. Pat. App. No. 63/033,718, filed Jun. 2, 2020, the entire disclose of which is incorporated herein by reference.

BACKGROUND OF THE INVENTION

Field of the Invention

The present disclosure relates to the field of communications. In particular, this disclosure relates to systems and methods for providing a blinded messaging system and method, which facilitates one party seeking individuals with particular skills, backgrounds, or other attributes in a de-identified manner that preserves the anonymity of the individuals being searched.

Description of the Related Art

The world is increasingly concerned with the privacy of personal and identifying information, particularly in the interconnected digital age where the vast majority of information about people is stored on computer networks. Governments have responded with legislative efforts focused on protecting and maintaining personal privacy, such as the General Data Protection Regulation ("GDPR") and the California Consumer Privacy Act ("CCPA"). These and other laws highlight the desire by many to maintain the privacy of personal information. In the United States, there is not yet a comprehensive federal scheme for general privacy protection, but federal law does include a number of subject-matter specific laws targeted to the privacy of specific types of personal information. Examples include the Family Educational Rights and Privacy Act ("FERPA") and the Health Insurance Portability and Accountability Act ("HIPAA"), which require certain institutions and types of data custodians to protect, respectively, educational student data, and health care information.

While these laws are valuable and important, they do have some undesirable downstream effects. For example, the current state of FERPA guidelines protects information about students. With some exceptions, this law generally prohibits educational institutions from disclosing information in children's educational records to third parties other than parents or legal guardians without the student's parent or guardian's prior (usually written) consent. This covers a range of records, ranging from grades to aptitude and interest tests and survey scores to behavior records, such as educational disciplinary actions or even extracurricular group membership This makes it difficult for third parties to identify specific students or groups of students for whom certain educational or career information or materials are most relevant or applicable. For example, suppose an international non-profit organization providing vaccinations to emerging economies seeks to expand to a new country and is interested in graduating students who may be interested in the mission of the organization and/or have language proficiency in the new country. The organization cannot simply contact schools and request lists of students majoring in health science or international affairs, or those who have majored in or speak another language, because disclosing that information without the student's prior consent is not permitted. This means that organizations can merely advertise their mission and goals broadly and hope that their message reaches the students most likely to be interested and well-suited for the opportunity.

This results in a poor noise-to-bandwidth ratio at job fairs and recruiting events for graduating students, who may wander from booth to booth in crowded auditoriums for hours and become frustrated and discouraged, even while perhaps passing right by an ideal match without realizing it simply because the student didn't see the organization's signage. This makes the search for students by enterprises unnecessarily difficult and expensive, and it makes the search by students for interesting and enriching educational, work, or volunteer opportunities unnecessarily overwhelming, frustrating, and daunting. This can also result is students making life-changing decisions without access to the best and most relevant information, and perhaps even taking mismatched opportunities out of desperation, which can result in low job satisfaction, building the wrong kind of resume, and generally sending the student off on the wrong career path while saddled with oppressive student loan debt.

While this is certainly true in college, this is likely even more applicable for high school students, who generally lack significant exposure to the job market and are often unaware that certain careers exist at all or are misinformed about the requirements or qualifications of certain jobs and career options, many of which have been heavily fictionalized and misrepresented in popular culture.

Additionally, certain types of careers and educational opportunities are best suited to students with specific backgrounds and interests. Performance in school is of interest to employers, the military, public agencies, as well as colleges and trade schools. Factors such as grades, classes taken, attendance, and extra-curricular activities (e.g., service organizations, athletics, and clubs) can all be indicators of bib s inability for jobs, projects, majors, or other opportunities. Organizations seeking candidates for job, career, or educational opportunities rarely benefit from attracting mismatched students, and instead seek students with the right combination of academic achievement, interests and activities.

Therefore, what is needed in the art is a system that facilitates "blinded" messaging between such institutions and students that protects the privacy of student information while also assisting students with using their educational experiences and other qualifications to identify promising career and educational opportunities. Such a solution should also provide a mechanism for providers (e.g., employers and educational institutions) to reach students whose qualifications (e.g., grades, attendance, interests, career goals, extra-curricular activities) are a good match for the providers' available opportunities.

SUMMARY OF THE INVENTION

The following is a summary of the invention in order to provide a basic understanding of some aspects of the invention. This summary is not intended to identify key or critical elements of the invention or to delineate the scope of the invention. The sole purpose of this section is to present some concepts of the invention in a simplified form as a prelude to the more detailed description that is presented later.

Because of these and other problems in the art, described herein, among other things, is a computer-implemented method for implementing a blinded messaging service comprising: providing a server computer communicably coupled to a telecommunications network, the server computer programmed to provide a blinded messaging service over the telecommunications network; providing a provider computer of at least one provider, the provider computer communicably coupled to the server computer via the telecommunications network; providing a plurality of candidate computers, each candidate computer being a computer of a candidate and communicably coupled to the server computer via the telecommunications network; receiving at the computer server, for each candidate in the plurality of candidates, candidate profile data for the each candidate; receiving, at the computer server from the provider computer, a communication comprising candidate selection criteria, the candidate selection criteria comprising information about characteristics desired by the at least one provider for a candidate for an opportunity offered by the provider; receiving, at the computer server from provider computer, a communication comprising information about the opportunity; the computer server determining, based on a comparison of the received candidate selection criteria to the candidate profile data for each candidate in the plurality of candidates, a second plurality of candidates whose candidate profiles match the received candidate selection criteria; and for each candidate in the second plurality of candidates, receiving, at the candidate computer for the each candidate in the second plurality of candidates, a copy of the received communication comprising information about the opportunity.

In an embodiment of the method, the candidate profile data for each candidate in the plurality of candidates comprises educational data about the each candidate.

In a further embodiment of the method, the educational data comprises one or more of grades, classes taken, grade point average, attendance history, standardized test scores, and certifications received.

In a further embodiment of the method, the opportunity is selected from the group consisting of: a job, admission to an academic institution, and enlistment in military service.

In a further embodiment of the method, the method further comprises: receiving, at the provider computer, a message comprising the number of candidates in the second plurality of candidates.

In a further embodiment of the method, the method further comprises: determining, at the computer server, whether the number of candidates in the second plurality of candidates is at or above a predefined threshold; only if the computer servers determines that the number of candidates in the second plurality of candidates is at or above the predefined threshold, the computer server transmitting to the provider computer a message comprising the number of candidates in the second plurality of candidates; and if the computer server determines that the number of candidates in the second plurality of candidates is not at or above the predefined threshold, the computer server does not transmit to the provider computer the message comprising the number of candidates in the second plurality of candidates.

In a further embodiment of the method, the method further comprises: in response to receiving the copy of the communication comprising information about the opportunity, at least one candidate in the second plurality of candidates manipulating a user interface of the candidate computer of the at least one candidate to draft a response message to the at least one provider; receiving, at the computer server, the at least one candidate response message; the computer server editing the at least one candidate response message to remove from the response message any personal information of the at least one candidate; the computer server transmitting the edited at least one candidate response message to the at least one provider; and receiving, at the at least one provider computer, the transmitted edited at least one candidate response.

In a further embodiment of the method, the computer server editing the at least one candidate response message to remove from the response message any personal information of the at least one candidate comprises replacing any text in the response message consisting of any candidate profile data for the at last one candidate with anonymized text.

In a further embodiment of the method, the at least one candidate response message includes image or video data, and the computer server editing the at least one candidate response message to remove from the response any personal information of the at least one candidate comprises anonymizing any portion of the image or video data consisting essentially of any candidate profile data for the at least one candidate.

In a further embodiment of the method, the anonymizing comprises modifying the image or video data to blur, pixelate, or obscure the portion.

In a further embodiment of the method, at least one candidate response message includes a digital file and the computer server editing the at least one candidate response message to remove from the response any personal information of the at least one candidate comprises removing from the digital file metadata comprising any candidate profile data for the at least one candidate.

In a further embodiment of the method, the receiving, at the computer server for each of the candidates, candidate profile data comprising information about the candidate comprises the computer server: causing to be displayed on the candidate computer for the each candidate one or more surveys comprising one of more survey questions; and collecting from the each candidate responses to each of the one of more survey questions of the one or more surveys.

In a further embodiment of the method, the method further comprises: in response to receiving the copy of the communication comprising information about the opportunity, at least one candidate in the second plurality of candidates manipulating a user interface of the candidate computer of the at least one candidate to initiate a chat session with the at least one provider.

In a further embodiment of the method, the initiating the chat session comprises: displaying on a display of the candidate computer of the at least one candidate a chat interface updated in real-time with messages sent by the at least one provider to the at least cone candidate; and displaying on a display of the provider computer a chat interface updated in real-time with messages sent by the at least one candidate to the at least one provider; wherein the provider computer does not receive personal information of the at least one candidate and the chat display of the provider computer does not display personal information of the at least one candidate.

In a further embodiment of the method, the method further comprises: for each chat message sent by the at least one candidate, receiving, at the computer server, the each chat message; the computer server editing the each chat message to remove from the each chat message personal information of the at least one candidate; the computer server transmitting the edited each chat message to the at least one provider; receiving, at the provider computer, the transmitted edited each chat message; and the displaying on a display of the provider computer a chat interface updated in real-time with messages sent by the at least one candidate to the at least one provider further comprising displaying on the display the received edited each chat message.

In a further embodiment of the method, the computer server editing the each chat message to remove from the each chat message personal information of the at least one candidate comprises replacing any text in the each chat message consisting of any candidate profile data for the at last one candidate with anonymized text.

In a further embodiment of the method, at least one message in the each chat message comprises image or video data, and the computer server editing the each chat message to remove from the each chat message personal information of the at least one candidate composes anonymizing any portion of the image or image or video data consisting essentially of any candidate profile data for the at least one candidate.

In a further embodiment of the method, at least one message in the each chat message comprises a digital file, and the computer server editing the each chat message to remove from the each chat message personal information of the at least one candidate comprises removing from the digital metadata comprising any candidate profile data for the at least one candidate.

Also described herein, among other things, are methods, systems, and computer instructions on storage media for allowing blinded messaging such as for the use of FERPA protected information comprised of: receiving protected information; allowing a message originator to specify a preferred profile of FERPA protected information; storing said preferred profile; comparing the FERPA protected information of the student with said preferred profile; and allowing communications from the message originator to the student without revealing to the message originator any information on the student; wherein the provider is able to send blinded messaging to students based on FERPA-protected information without said information being disclosed to the provider.

In an embodiment of the method, the message initiator receives notification from the database of a match to the message initiator's preferred profile.

In an embodiment of the method, the received notification from the database of a match to the message initiator's preferred profile includes the number of students which match the preferred profile.

In an embodiment of the method, the message initiator is able to generate and send a message, which may include text, images or graphics.

In an embodiment of the method, the FERPA protect student is able to respond to a "blinded" message.

In an embodiment of the method, a student can transmit images.

In an embodiment of the method, a student can respond with text.

In an embodiment of the method, a student can respond with an image.

In an embodiment of the method, a student can respond with a graphic.

In an embodiment of the method, a student can respond with a hieroglyph.

In an embodiment of the method, the FERPA protected information is received from an educational institution.

In an embodiment of the method, the FERPA protected information is submitted by a student.

In an embodiment of the method, the FERPA protected information is submitted by a parent of a student.

In an embodiment of the method, providers cannot initiate communication from with a student, but can participate in a conversation once a student has initiated the communication.

In an embodiment, message initiator can store files (documents, pictures, etc.) which they can easily inject into communications in a message initiator file library.

In an embodiment of the method, students can store files (resume, pictures, etc.) which they can easily inject into communications in a student file library.

In an embodiment of the method, providers and FERPA protected students can communicate in real-time.

In an embodiment of the method, providers can "broadcast" or create and send broadcast messages to FERPA protected students. Providers are not given any specific details about the students who receive the message other than a count of students who will receive the message (less than five students is simply displayed as "less than five students").

In an embodiment of the method, users can respond to a survey collecting general information for the profile display of the provider, including logo, description, social links, etc.

In an embodiment of the method, users can respond to a survey providing a complete editor for the provider to create and manage pathways.

In an embodiment of the method, providers can add, edit, and remove pathways.

DESCRIPTION OF THE PREFERRED EMBODIMENT(S)

Figure 1:
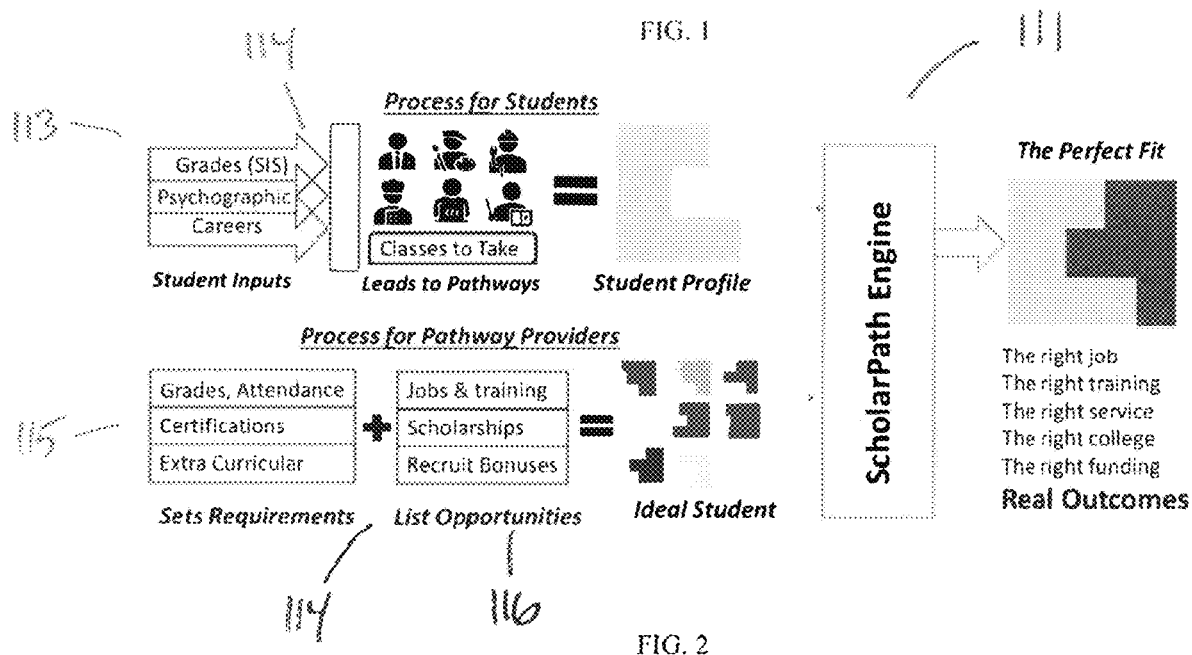
FIG. 1 provides a general schematic of an embodiment of a blinded messaging system according to the present disclosure.

The following detailed description and disclosure illustrates by way of example and not by way of limitation. This description will clearly enable one skilled in the art to make and use the disclosed systems and methods, and describes several embodiments, adaptations, variations, alternatives, and uses of the disclosed systems and methods. As various changes could be made in the above constructions without departing from the scope of the disclosures, it is intended that all matter contained in the description or shown in the accompanying drawings shall be interpreted as illustrative and not in a limiting sense.

At a high level of generality, this disclosure is directed to systems and methods for certain institutions to send blinded messages to an unknown pool of candidates about opportunities while protecting the privacy of die individuals in the pool, and the parties that receive the receive the messages.

Throughout this disclosure, the term "opportunities" means job, career, or educational openings or opportunities that one is not generally entitled to by law, but rather must qualify for through an application and vetting process, during which the candidates supply information relevant to the opportunity, which information is then reviewed by a decision-making board to determine which candidate or candidates shall be offered the chance to participate in the opportunity. Examples include job openings and careers in the public or private sector (profit or non-profit), admission to an educational institution (including but not limited to junior colleges, tour-year universities, trade and vocational schools, and the like), military postings, positions with government agencies, participation in extra-curricular activities, as well as opportunities to earn awards, recognition, and accolades, such as scholarships, writing competitions, and the like.

Throughout this disclosure, the term "provider(s)" means an enterprise, firm, agency, or other organization having one or more opportunities to offer to one or more candidates. Examples include private employers, non-profit organizations, service organizations, educational institutions, the military, other government agencies, and the like.

Throughout this disclosure, the term "candidate(s)" means an individual or group of individuals who are seeking or otherwise may be interested in a opportunity offered by a provider. Candidates may be un-emancipated minors/children (i.e., under the age of majority for the jurisdiction, which generally 18 in the United States), or emancipated minors or legal adults (who may or may not still rely on parents/guardians for input and direction). The focus of this disclosure is on students, and so candidates are generally students, but a person of ordinary skill in the art will recognize that there may be circumstances outside of the educational system where sending blinded messages in the manner described herein could be useful. The term "parents" means the legal guardians of a non-emancipated minor candidate. The legal guardian is typically the biological or legal parent or parents of the candidate but may also be a legal guardian or other individual with legal authority to represent the interests of the minor candidate.

Throughout this disclosure, the term "blinded" refers to communications prepared by or behalf of a provider, and sent by a provider to a candidate or pool of candidates identified to receive the communication based upon certain criteria defined or selected by the provide in advance related to the characteristics of candidates the provider desires to receive the communication, but the provider does know in advance the identity of the candidate(s) or pool of candidates who are eligible to receive, actually do receive, the message, except to the extent any recipient(s) contact the provider or otherwise respond to the communication. The recipient candidates usually receive the identity of the provider who sent the communication (typically in the communication itself).

Throughout this disclosure the term "computer" means hardware which generally implements functionality provided by digital computing technology, particularly computing functionality associated with microprocessors. The term "computer" is not intended to be limited to any specific type of computing device, but it is intended (unless otherwise qualified) to be inclusive of all computational devices including, but not limited to: processing devices, microprocessors, personal computers, desktop computers, laptop computers, workstations, terminals, servers, clients, portable computers, handheld computers, cell phones, mobile phones, smart phones, tablet computers, server farms, hardware appliances, minicomputers, mainframe computers, video game consoles, handheld video game products, and wearable computing devices including, but not limited to eyewear, wristwear, pendants, fabrics, and clip-on devices.

As used herein, a "computer" is necessarily an abstraction of the functionality provided by a single computer device outfitted with the hardware and accessories typical of computers in a particular role. By way of example and not limitation, the term "computer" in reference to a laptop computer would be understood by one of ordinary skill in the art to include the functionality provided by pointer-based input devices, such as a mouse or track pad, whereas the term "computer" used in reference to an enterprise-class server would be understood by one of ordinary skill in the art to include the functionality provided by redundant systems, such as RAID drives and dual power supplies.

It is also well known to those of ordinary skill in the art that the functionality of a single computer may be distributed across a number of individual machines. This distribution may be functional, as where specific machines perform specific tasks; or, balanced, as where each machine is capable of performing most or all functions of any other machine and is assigned tasks based on its available resources at a point in time. Thus, the term "computer" as used herein, can refer to a single, standalone, self-contained device or to a plurality of machines working together or independently, including without limitation: a network server farm, "cloud" computing system, software-as-a-service (SAAS), or other distributed or collaborative computer networks. Thus, to the extent this disclosure describes systems or methods as being performed by or on a computer, a person of ordinary skill in the art will understand that, unless specified otherwise, the systems and methods may be implemented on a single device or distributed across multiple devices.

Those of ordinary skill in the art also appreciate that some devices not conventionally thought of as "computers" nevertheless exhibit the characteristics of a "computer" in certain contexts. Where such a device is performing the functions of a "computer" as described herein, the term "computer" includes such devices to that extent. Devices of this type include, but are not limited to: network hardware, print servers, file servers, NAS and SAN, load balancers, IoT devices, smart devices, and other hardware capable of interacting with the systems and methods described herein in the matter of a conventional "computer."

Throughout this disclosure, the term "software" refers to code objects, program logic, command structures, data structures and definitions, source code, executable and/or binary files, machine code, object code, compiled libraries, implementations, algorithms, libraries, or any instruction or set of instructions capable of being executed by a computer processor, or capable of being converted into a form capable of being executed by a computer processor, including, without limitation, virtual processors, or by the use of run-time environments, virtual machines, and/or interpreters.

Those of ordinary skill in the art recognize that although software is traditionally stored in a non-transitory computer-readable medium and loaded into memory on demand for execution, software can also be wired or embedded into hardware, including, without limitation, onto a microchip, and still be considered "software" within the meaning of this disclosure. For purposes of this disclosure, software includes, without limitation: instructions stored or storable in hard drives, RAM, ROM, flash memory BIOS, CMOS, mother and daughter board circuitry, hardware controllers, USB controllers or hosts, peripheral devices and controllers, video cards, audio controllers, network cards, Bluetooth® and other wireless communication devices, virtual memory, storage devices and associated controllers, firmware, and device drivers. The systems and methods described here are contemplated to use computers and computer software typically stored in a computer- or machine-readable storage medium or memory.

Throughout this disclosure, the term "network" generally refers to a voice, data, or other telecommunications network over which computers communicate with each other. The term "server" generally refers to a computer providing a service over a network, and a "client" generally refers to a computer accessing or using a service provided by a server over a network. Those having ordinary skill in the art will appreciate that the terms "server" and "client" may refer to hardware, software, and/or a combination of hardware and software, depending on context. Those having ordinary skill in the art will further appreciate that the terms "server" and "client" may refer to endpoints of a network communication or network connection, including, but not necessarily limited to, a network socket connection. Those having ordinary skill in the art will further appreciate that a "server" may comprise a plurality of software and/or hardware servers delivering a service or set of services as described elsewhere herein. Those having ordinary skill in the art will further appreciate that the term "host" may, in noun form, refer to an endpoint of a network communication or network (e.g., "a remote host"), or may, in verb form, refer to a server providing a service over a network ("host a website"), or an access point for a service over a network.

Throughout this disclosure, the term "mobile device" and similar terms refers to a specific type of computer, generally a personal, carried mobile communication device such as, but not necessarily limited to, a smart phone, tablet PC, e-reader, or wearable computer such as a smart watch or fitness device, whether of general or specific purpose functionality. Generally speaking, a mobile device is network-enabled and in communication with other network-enabled devices (which may or may not be mobile devices) over one or more networks. A mobile device is usually intended to be in near-constant real-time communication with other devices over such networks while powered on.

Throughout this disclosure, the term "real-time" refers to software operating within short enough operational deadlines for a given event to commence or complete, or for a given module, software, or system to respond, that the responsiveness of the system is, in ordinary user perception within the technological context, effectively cotemporaneous with a reference event. For example, when the user clicks on an interface element, the system exhibits some kind of response that indicates that click was received and is being, or already has been, processed and acted upon. Those of ordinary skill in the art understand that "real-time" does not literally mean the system processes input and/or responds instantaneously, but rather that the system processes and/or responds rapidly enough that the processing or response time is within the general human perception of the passage of real-time in the operational context of the program. Those of ordinary skill in the art understand that, where the operational context is a local graphical user interface, "real-time" normally implies a response time of no more than one second of actual time, with milliseconds or microseconds being preferable. However, those of ordinary skill in the art also understand that, under other operational contexts, a system operating in "real-time" may exhibit delays longer than one second, particularly where network operations are involved.

Described herein, among other things, are systems and methods for a communication platform designed to protect the personal privacy of candidates, provide control and transparency to the parents and/or guardians (when applicable), and facilitate providers to communicate directly with candidates about opportunities the providers offer. As will be clear a person of ordinary skill in the art, the platform uses computers and digital data stored on computers, combined with network access and operations to implement the systems and methods as contemplated herein. The systems and methods may be created as a web site, standalone desktop application, web app, network service, downloadable application, a combination of these technologies, or another structure or implementation suitable for performing the functions described herein.

The platform facilitates messaging to candidates without revealing to the provider the identity of the candidate(s) who are in the pool of potential recipients, or who actually receive the messages. The platform thereby facilitates the process of providers recruiting and improving their talent pool and talent acquisition. Providers can target groups of candidates based on de-identified data to better inform the most relevant candidate population about available opportunities and assist in talent acquisition.

These systems and methods can be used whenever it is desirable to de-identify personal data to permit a third party to send information to a class of recipients based on selection criteria related to the characteristics of the class members without knowing in advance the identities of the class pool or individual recipients, including but not limited to for respecting the privacy of students in accordance with FERPA guidelines. However, this is by no means limiting and the system could also be used other contexts. By way of example and not limitation, similar techniques could be used to facilitate communications with covered entities under HIPAA.

Figure 4:
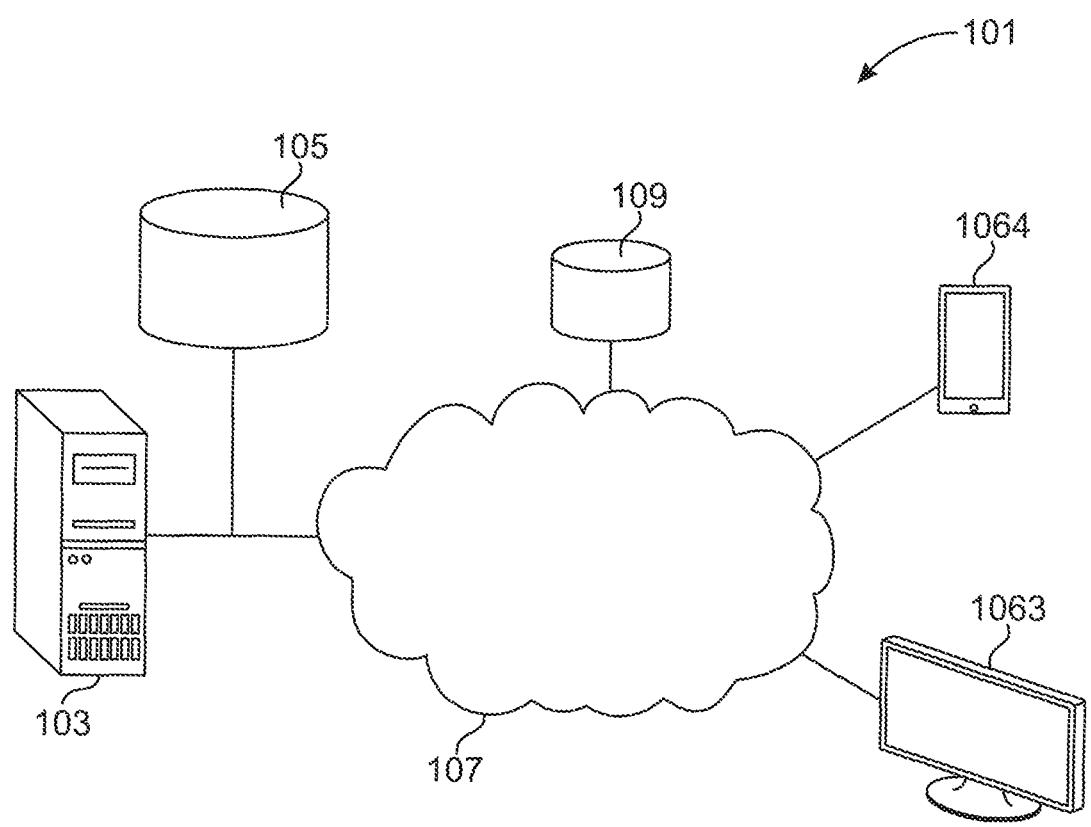
FIG. 4 provides an embodiment of a system far implementing a blinded messaging system according to the present disclosure.

FIG. 4 depicts an exemplary, non-limiting embodiment of a typical architecture for implementing the systems (101) and methods. In the depicted embodiment of FIG. 4, the platform is implemented through a combination of software running on a server computer (103) and on clients, such as a personal mobile devices (106A), or desktop computer (106B). The clients (106A) and (106B) communicate with the server computer (103) via a network (107), generally at least in part the public Internet (107). The server computer (103) is typically connected one or more private databases (105) which directly provide data storage and retrieval as necessary to implement the functionality described herein. The database(s) (105) may be local to the server computer (103) or may be accessible by it over a network connection. Additionally, one or more third party databases (109) may be accessed by the server computer (103) and/or clients (106A) and (106B) to implement the functionality described herein.

Figure 2:
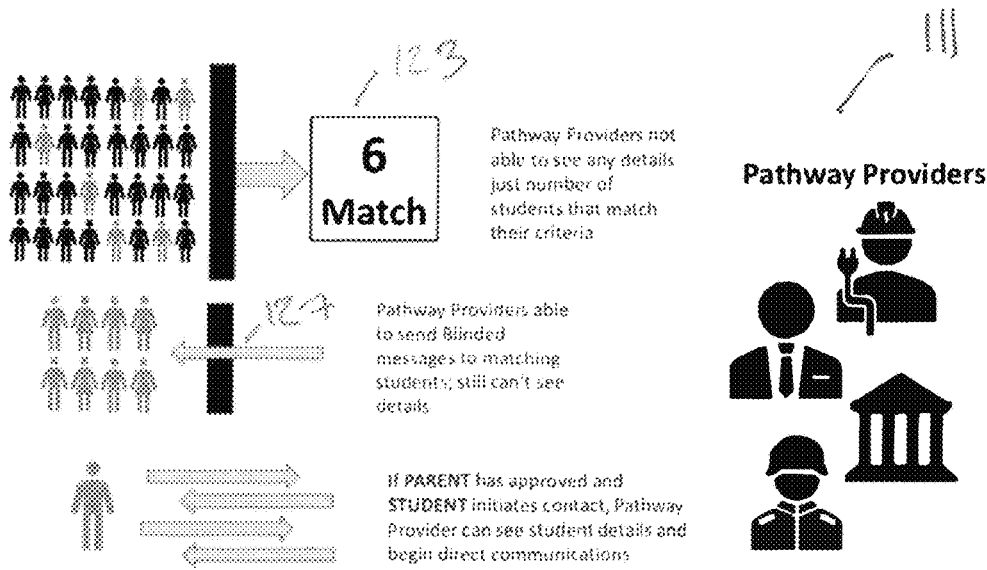
FIG. 2 provides a general schematic of an embodiment of a blinded messaging system according to the present disclosure.
Figure 3:
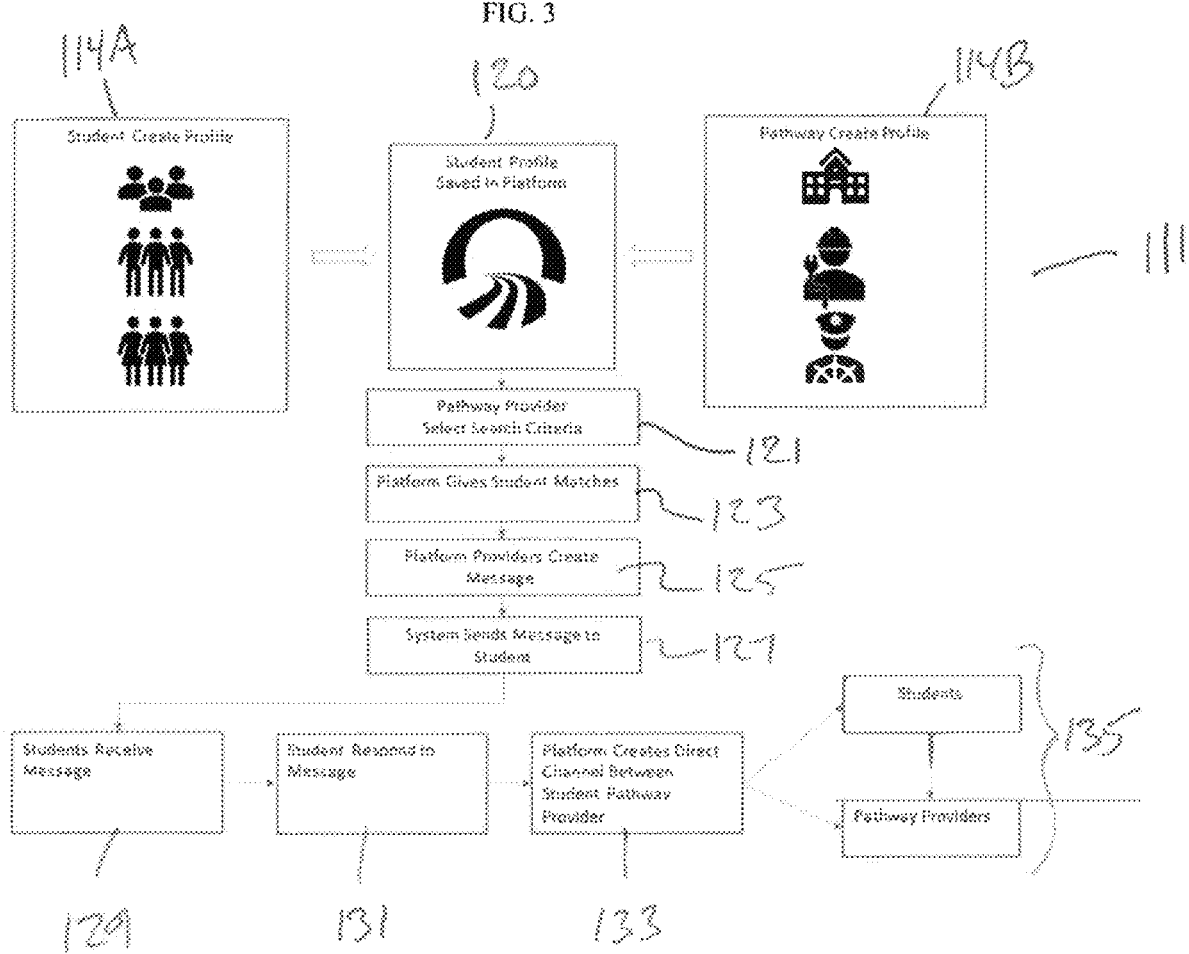
FIG. 3 provides a flow chart of an embodiment of the operation of a blinded messaging system according to the present disclosure.

FIGS. 1-3 depict exemplary, non-limiting embodiments (111) of the methods contemplated herein, which may be carried out by the system (101) depicted in FIG. 4 (or other systems or hardware with suitable architectures to perform the functions described). As can be seen in FIG. 1, conceptually, the methods comprise two parallel tracks (113) and (115) by which candidates on the one hand, and providers on the other hand, supply information to the platform, which is then used to facilitate the blinded messaging described herein. When functions are described herein applicable to either candidates or providers, they may be referred to generically as "users."

Broadly speaking, users create accounts and establish user profiles (114) in the conventional manner that will be familiar to a person of ordinary skill in the art. Once the user creates an account, the user may establish and fill out a profile. The details of these processes (113) and (115) differ for candidates and providers, as described in further detail elsewhere herein. This interaction is generally carried out by the user running software on a client device (106A) and (106B) which provides a manipulable interface for providing the information and transmitting it to the server computer (103) for processing and storage in the private database (105).

The private database (105) may also include other data. By way of example and not limitation, the private database (105) may comprise datasets about opportunities (116) associated with specific providers. This information may be supplied by the providers themselves or may be downloaded or otherwise collected from one or more third party databases (109), such as via an API, screen scraper, or other technique. By way of example and not limitation, one such third party database (109) is O*NET, a database for careers and occupations in the United States.

The private database (105) may also comprise data comprising career profiles. A career profile is a general outline of a career, including the general qualifications for it to help candidates develop an understanding of the requirements, and information about providers who have opportunities in that career and the specific types of jobs available. For example, the database (105) may include a career profile for a veterinarian, and describe, the educational requirements, licensing requirements, and other steps generally required to have a career in veterinary science, and may include examples of careers for veterinarians (domestic pets, conservation and wildlife, laboratory practice, research, ranch/farm practice, aquatic, etc.), specific opportunities and the providers who offer them (e.g., academic institutions with veterinary science programs and/or certification programs for specific areas of interest, or employers or government agencies with job openings for qualified candidates). The profile may also include data or other statistics about the career, including but not necessarily limited to educational cost and duration, training cost and duration, certification and/or licensing requirements, salary data (e.g., average starting salary for various jobs, salary after 5 years, 10 years, etc.), and long-term opportunities beyond entry-level positions and the general requirements to qualify for them.

As discussed above, users may have profiles and customize their profiles (114), (114A) and (114B). For example, providers nay create profiles (114B) to market and promote themselves, the opportunities they offer. Career profiles (114B) may also be associated in the database (105) with providers who have opportunities related to that career profile. An implementation may include a profile page for the provider with various options for other users (generally candidates but potentially also other providers) to interact with the provider or the provider profile, such as direct messaging, and social networking conventions, such as bookmarking, liking, favoring, subscribing, following, and the like.

By way of example and not limitation, a university may have a profile for its veterinary science degree program, which interested candidates can reference to conduct research about the program and its qualifications, cost, and timeline. The provider profile may also include references to notable people in the field who are associated with the program, such as respected researchers, professors, or alumni. Other providers with downstream opportunities in that field, such as laboratories, researchers, and wildlife conservative organizations, might also link to or associate with the university program page, providing a connection of independent providers within the same career profile, each of which represents a step along the pathway of that career.

By allowing a plurality of providers to link to the career profile and/or each other, a network of pathways is created organically within the database (105) to represent a variety of different manners in which a candidate might approach a given career, while also providing candidates a view of the general landscape of the career and field, including key or central players.

For some opportunities, a single provider may comprise the entire pathway through the career. For example, a career in the Armed Forces generally begin with enlistment and the recruit proceeds through a full career in one organization (e.g., the Air Force). Some careers, such as in the military and certain types of government agencies (e.g., the United States Patent and Trademark Office) have only one pathway defined by the organization. For example, there is only one USPTO and if one wishes to become a United States patent examiner, there is only one employer for that position. In other instances, a specific provider may have a unique or unusual pathway for a career to offer or may simply wish to custom-define a specific pathway to better define the qualifications desired for the opportunities that provider offers. Likewise, specific opportunities such as scholarships may have a very specific set of requirements to qualify. Such pathways are defined by the providers who offer then and also stored in the database (105), where they can be searched and viewed by other users. Again, such pathways may comprise employment, academic, educational, vocational, or other training opportunities. In an embodiment, they may be linked to career profiles and the provider(s) offering them.

One manner in which the platform differs from a conventional service of this type is that candidate user interactions are generally anonymized. That is, when a candidate user (even a user who has set up a profile and whose identify is known and confirmed) is authenticated and logged into the platform, and interacts with a career profile, provider profile, or career pathway, the interaction may be noted and stored in the database (105) and be accessible and retrievable by the candidate user, but the identity of the candidate user is not provided or made available to the provider user.

Thus, providers cannot, for example, retrieve or access a list of candidate users who have "Liked" or even visited the provider user's profile page or any associated career profiles or pathways. Providers can collect only de-identified, anonymous data at the aggregate level (e.g., the total number of candidate users who have "Liked" the provider's profile or a particular career or pathway offered by the provider). In an embodiment, the provider may also be able to access other aggregate data about that population, again on a de-identified, anonymous basis that does not reveal any protected or private personal information or details about any one user, such as the average high school grade point average of that population. In a situation where the population of users is small enough that it might be possible to identify the user (e.g., the problem of small sample sizes), even that information may be withheld from providers until the population size reaches a large enough size that conclusion inferences cannot be drawn from it.

In an embodiment, and as shown in FIG. 2, providers may have access to a broadcast messaging function, which is designed to give providers the ability to send out targeted communications to a group of recipients defined by criteria selected (121) by the provider, but without sharing with the provider any information about any of the candidate users in the pool of potential recipients, or any candidate users who actually receive the communication in question. The criteria that providers may use to identify the population is limited only by the data collected from candidate users and stored by the system.

For example, a veterinary, science program may be aware that a state fair is approaching in a state with a strong farming and ranching economy and be sponsoring the fair or representatives of the program may be attending the fair. The provider may draft a communication message intended for students who live in the zip codes nearest the state fair, who are juniors or seniors in high school, and who have high enough GPAs to be eligible for the program. This message can be sent to watching, candidate users by the platform, but without information to the provider of which specific users match those criteria, or which specific users received the message. In an embodiment, the provider might be provided with a number, or approximate number, of candidate users that match the criteria, but again, even this information may be withheld if the criteria are specific enough, and/or the resulting sample size is small enough, that inferences about identity could be drawn from the number alone in an embodiment, this number is 20. In another embodiment, this minimum is 30. The specific number may vary in other embodiments. This prevents a provider from abusing the law of small numbers to obtain protected personal information about individual users. Notably, the interface design and security design of the server and database also inhibit the provider from being able to retrieve a list of candidates who received the message or otherwise matched the criteria. As described above, this type of messaging is referred to as "blinded" messaging because although the provider can select the type of candidate to receive it, the provider cannot see which candidates receive it.

By way of further non-limiting examples, selection criteria (121) may include a s interest in a specific provider (as collected via the surveys described elsewhere herein in connection with establishing the candidate profile), such as a specific college or university, a particular vocational union, or a particular government agency such as the Armed Forces or the National Parks. By way of a still further non-limiting example, selection criteria (123) may include a candidates interest in a specific career offered by a provider, such as civil engineering, HVAC, commercial construction, CNC machinist, or nurse. By way of a still further nonlimiting example, selection criteria (121) may include a candidate's specific high school, grade level, and/or or residence in a specific Metropolitan Statistical Area.

The matching between selection criteria (121) and stored candidate profiles (120) is generally performed by the server computer (103), which is outside the direct control of the providers, and which can conduct the matching anonymously (123) without the provider learning the identifes of the recipients. The provider also prepares a message (125) to be sent and the server computer (103) sends the message to the matching candidates (127).

On the candidate side of the user experience, such messages are received (129) by the candidate and may appear in the user interface on the client device (106A) or (106B), such as in an activity feed. The user can then interact (131) with the message (again, anonymously and without revealing his or her identify or personal details) to get more information about it. The content of the communication may be whatever the provider desires to share, such as promoting events or simply sharing information about careers and/or pathways the provider offers. By way of example and not limitation, candidate uses may also be able to RSVP (131) to provider events (again, anonymously, but giving the provider a headcount), which can assist providers in evaluating candidate interest in different types of events, as well as engaging in event planning for the number of attendees (e.g., renting a large enough venue, ordering enough food, having enough staff, etc.). The content may also include links back to the provider's profile. Candidate users may also have the ability to respond to (131) or otherwise communicate with (135) a provider, such as via a direct message interface (133), or an "ask us a question" interface. Such communications may be made anonymously, allowing the provider to respond or reply to the question or inquiry, again without knowing the specific identity of the candidate. Alternatively, if the candidate desires, and only at the candidate's (or additionally the candidate's parents') election, the communication may be made non-anonymously.

Providers will typically be required to agree to certain terms of service before engaging in communication and authorization can be revoked at any time if the provider is found to be in violation of these terms or attempting to circumvent the security protections that prevent unauthorized access to protected personal information.

Likewise, candidate users must agree to certain terms, which the candidate user-directly if he or she can verify that he or she has reached the age of majority, or, if not, a parental approval process may be used, in which case parental approval may also be required for the candidate to engage in any non-anonymous interactions on the platform. In an alternative embodiment, the parent may be able to give a blanket authorization for such communications so that communication is not slowed or inhibited unnecessarily. If the candidate user cannot be verified as being at least 18 years or age or approved to use the platform by a parent, the candidate has "read only" access to the platform and can use it for research but cannot interact or communicate with others.

In an embodiment, a candidate user and provider may initiate a private communication session (133), which may be carried out in real-time or on a "post" basis (i.e., a bulletin-board style). This may only be done by the candidate user initiating the communication, at which point the platform creates a communication "room" or "channel" (133) associated with a unique identifying code. This code may be automatically generated or created by the user and shared with the provider. The "room" is only available and accessible to the candidate user and the invited provider and can be closed at any time by either participant. Again, this may be done anonymously, meaning that the provider does not receive the name or any other personal information of the user. In an embodiment, the system monitors candidate user input in real-time and if the user is detected as attempting to provide any personally identifying details, such as his or her name or location or other information stored in the candidate user profile, the platform may automatically excise that information from the communication so that it does not ever reach the provider. This may be done using any number of techniques, ranging from (but not limited to) regular expression text matching to fuzzy matching to natural language processing. In an embodiment, an anonymous "handle" or nickname may be selected by the candidate user and displayed in such communications to preserve the user's anonymity, or a handle may be automatically generated by the platform. Alternatively, in certain situations, the user may be able to provide his or her first name and possibly last initial to avoid confusion.

Messages sent to the room are first stored in the private database (105) and the content is encoded or encrypted or stored in an encoded or encrypted storage medium. To achieve push notifications and limit the exposure of protected or private information, a push notification is created which contains only an anonymized identifier for the candidate user, and a unique identification number of the message. The anonymized identifier for the candidate user may be a unique identification number, handle, blanks, punctuation (e.g., asterisks), or the like. When the provider's client device receives the unique identification number of the message, it requests that the server transmit the room identification and message content securely from the system's database (e.g., via an encrypted network connection). This prevents the provider from learning the identity of the candidate who sent a message (or will receive the providers response), as well as the message communicated.

In an embodiment, the system may be designed such that a parent, and/or teachers, counselors, or other advisors, can securely view the communications to and from a candidate user. This does not turn afoul of regulatory requirements for privacy because such individuals are generally authorized to access and view the candidate's educational records in any event. Moreover, this feature provides transparency to ensure that providers are not attempting to learn identifies in appropriately, and that the platform is not being used improperly or for nefarious purposes. System administrators for either the server computer (103) software or the operating system or database itself may also have the technical ability to view communications and monitor for violations or problems, and/or respond to third party legal queries related to such violations.

In an alternative embodiment, the system may be configured so that candidates (on their own volition if at least 18, or with parental consent if not) may authorized the system to release contact information to a specific provider. This can only be done by the candidate at his or her initiative. Providers are generally discouraged from encouraging candidates to do so and may even be prohibited by the terms and conditions from doing so. Communications may be monitored for any such improper solicitation of personal information and violations may be removed or banned from further participation in the platform. In such an embodiment, the candidate may also have the option (again, on his or her own volition if at least 18, or with parental consent otherwise) to share other private or protected information such as the information supplied in connection with the candidate user profile (e.g., grades, GPA, attendance, classes taken, certifications and test scores, etc). The user may be able to choose specific information to share, to share all information, or share only categories of information (e.g., share grades and classes but not address or location). In an embodiment, such information may be displayed or made available to providers in a manner that makes it difficult or impossible to export, transfer, or copy the data off the system. As described elsewhere herein, for minors, parents may be able to monitor all messaging to the candidates to ensure transparency and propriety.

Another aspect of the systems and methods is that data files exchanged through the platform may be automatically cleansed of some or all metadata. This also helps to preserve anonymity by removing hidden sources of personal information. For instance, a photo taken on a candidate user's mobile device may contain EXIF data, which is additional metadata associated with the photo that can contain information about the device used to take it, including geographic location, date and time, and other information. Likewise, word processing and spreadsheet software can encode information about authors and editors. All such information may be automatically scrubbed from files that are uploaded to the platform at all, and particularly if shared with a provider.

Likewise, the aforementioned editing process may be used to eliminate international or inadvertent discloses of personal information via such documents (e.g., such as by reviewing document text for the candidate's name or using image recognition technology to search image data for the candidate's name and blurring it out or removing it).

Returning to the subject of candidate provides, as shown in FIG. 1, the candidates may establish profiles that include information that is private, and which may also be protected by a privacy law, such as FERPA. This may include educational data, which may be entered or supplied by the candidate, or retrieved directly or indirectly from the candidate's current school's student information system (e.g., a third-party database (109)). This information may comprise grades, classes taken, attendance, test scores, certifications, and the like. In an embodiment, the profile setup process may include presenting the candidate with one or more surveys, which may collect additional information about candidate interests, background, and careers and geographic preferences. This information may then be used by providers as search criteria for blinded messaging as discussed elsewhere herein.

By way of example and not limitation, the surveys may ask a series of questions about the candidate. This may include demographic information, such as sex, gender identification, race, age, geographic location or state of residence, and national citizenship. These criteria may be relevant to identifying unique opportunities, such scholarships intended for specific communities. The surveys may also or alternatively collect other information, such as a personal statement and integrations with other social media used by the candidate. The questions may seek information about factors important to the candidate in his or her careers, such as athletics, institution type, institution size, class size, environmental factors, location preferences, religious preferences, key interests, political preferences, and demographic preferences, such as single-sex schools and historically black colleges and universities. The surveys may also collect information about candidate accomplishments that are difficult to capture in a structured format, where the candidate can provide unstructured text to describe anything the candidate deems relevant or important. This can range from accomplishments and awards, such as leadership positions in activities, speaking multiple languages, playing an instrument, surviving a serious illness, or completing a triathlon.

In an embodiment, candidates may be presented with or have the option to complete specific third-party surveys commonly used by providers, notably employers, to assess candidates for fit. Examples include personality surveys, such as the Myers-Briggs Type Indicator, and the O*NET career survey. Questions may include, but are not necessarily limited to, the candidate's interest in volunteer, non-profit, or other private service organizations, such as AmeriCorps and the Peace Corps, as well as public service organizations and careers in the public sector. Once completed, the O*NET survey results may be stored in the database (105) as profile data and used by providers to message key talent as described elsewhere herein (e.g., by the matching module).

In an embodiment, the matching module may use candidate profile data, including survey response data, and weight specific personality traits to create an individualized career interest profile for the candidate with best-matching careers. For any given career, the matching module may be programmed to display to the user a visual representation of the candidate's personality traits (as measured by the survey), and how those traits align with a given career. This may be done, for example, using a "radar" visualization. This individualized career interest profile may be saved to the database and be viewing by the candidate later, as well as parents and educators.

In an embodiment, providers may create an "ideal candidate" profile for a given opportunity, career, or pathway. This profile may include preferences or requirements for based on grades, attendance, certifications, extracurricular activities, candidate interest, and present available jobs or internship programs. As previously described, this information may be made available in connection with the provider profile, and/or with relevant career profiles or pathways, permitting candidates to research careers, pathways, and associated providers to plan for a career (e.g., learn which classes to take and the grades and certifications they will need to achieve to pursue and fund that career or get a job in it).

In an embodiment, the system is programmed to automatically generates broadcast messages related to specific careers or pathways. Such messages may be issued by the system itself, rather than originating from a provider, and may also be targeted to specific populations in the same generally manner, or to specific candidates. By way of non-limiting examples, such system broadcasts may include: new provider matches as providers join the platform and/or the candidate adds to or modifies his or her candidate profile and/or completes or updates surveys; new provider updates and matches based on the candidate's performance (e.g., updated grades, GPA, certifications, courses completed, etc.); current employment opportunities from local employers or trades based on the candidate's location and profile information; current recruitment opportunities from government agencies, law enforcement, and/or military branches; and, available externship/internship/job shadowing/co-op opportunities.

The platform may be implemented as a set of one or more modules. For example, in an embodiment, the system may be comprised of one or more of the following: a candidate module (programmed to provide the candidate user experience and functionality), a providers module (programmed to provide the provider user experience and functionality), a matching engine (programmed to identify candidates who match provider criteria as described elsewhere herein), a private database (105), and a communications module (for secure and private communications as described elsewhere herein).

In an embodiment, the platform is made available to high school students. In another embodiment, the platform is made available to college students. In a still further embodiment, the platform is provided to candidates at an academic institution through the institution's on-campus network or as a service in connection with career counseling and other post-graduate planning curricula. An academic institution may also create candidate profiles for each student to facilitate adoption, and the school itself may register a provider to facilitate communication, such as announcing career fairs and other providers visiting campus. In this embodiment, the school can pre-load and automatically update the candidate profile, saving the candidate time, hassle, and maintaining accurate, up-to-date records.

Returning to the profile creation process, providers may also set up profiles (i.e., using the provider module). For college and universities, the provider module may connect to a third-party database (109) to automatically populate certain key fields. For example, if the provider type is a college or university, the module may pull in data from the National Center for Education Statistics. Other providers may be pre-populated on the database, such as providers who are the only source of a particular career (e.g., military service and government bureaus).

The provider may then add information about the provider, including multimedia content, as well as information about specific opportunities that might be available. As an example, an employer can add information on a specific job open to high school students. The Army may add information on a specific career need, such as a heavy equipment operator, satellite operating for Space Command, or mechanic. The provider generally specifies the required educational attainment for a specific opportunity. For careers that have a general career profile, the data may be populated by default with the requirements for the career more generally, allowing candidates to compare the requirements tor the specific position to the career generally. The provider may also be able to specify traits or characteristics that are desirable for the ideal candidate (i.e., via the "ideal candidate profile" feature described elsewhere).

In an embodiment, the platform includes a benchmarking feature, through which providers may ask its existing employees/students/recruits/etc. to fill out the surveys in order to "benchmark" how the surveys are typically completed by people who are successful and happy in the career. This information can then be used to construct the "ideal candidate" profile or send blinded communications to preferred candidates.

Once the provider, has created a profile and added opportunities, the provider is able to access the communications module of the platform, through which the pathway provider may select criteria to query the platform for matching candidates as described elsewhere herein. This includes sending blinded messages to the targeted candidates as described elsewhere herein.

The systems and methods described herein provide a comprehensive solution to the challenges that students, counselors, parents, and colleges, vocational schools, the military, the government, and employers have been grappling with for decades. This platform helps high school candidates imagine and achieve real career outcomes while also providing a talent acquisition platform for providers. This unique ecosystem attracts candidates by providing a free research platform that guides them to relevant organizations and institutions and assists with learning about and planning for a career, while also providing providers a way to reach motivated, well-qualified candidates. The system will change how candidates plan their future and how talent is recruited.

It will further be understood that any of the ranges, values, properties, or characteristics given for any single component of the present disclosure can be used interchangeably with any ranges, values, properties, or characteristics given for any of the other components of the disclosure, where compatible, to form an embodiment having defined values for each of the components, as given herein throughout. Further, ranges provided for a genus, or a category can also be applied to species within the genus or members of the category unless otherwise noted.

The qualifier "generally," and similar qualifiers as used in the present case, would be understood by one of ordinary skill in the art to accommodate recognizable attempts to conform a device to the qualified term.

While the invent has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

The invention claimed is:

1. A computer-implemented method for implementing a blinded messaging service comprising:
   providing a server computer communicably coupled to a telecommunications network, said server computer programmed to provide a blinded messaging service over said telecommunications network;
   providing a provider computer of at least one provider, said provider computer communicably coupled to said server computer via said telecommunications network;
   providing a plurality of candidate computers, each candidate computer being a computer of a candidate and communicably coupled to said server computer via said telecommunications network;
   receiving, at said computer server, for each said candidate, candidate profile data for said each candidate, said candidate profile data including Family Educational Rights and Privacy Act (FERPA) protected information;
   receiving, at said computer server from said provider computer, a communication comprising candidate selection criteria, said candidate selection criteria comprising information about characteristics desired by said at least one provider for a candidate for an opportunity offered by said provider;
   receiving, at said computer server from said provider computer; a communication comprising information about said opportunity;
   said computer server determining, based on a comparison of said received candidate selection criteria to said candidate profile data for each candidate, a plurality of candidates whose candidate profiles match said received candidate selection criteria; and
   for each candidate in said plurality of candidates whose candidate profile matched said received candidate selection criteria, said computer server sending to said candidate computer for said each candidate in said plurality of candidates, a copy of said received communication comprising information about said opportunity, without revealing to said provider an identity of any candidate in said plurality of candidates whose candidate profile matched said received candidate selection criteria.

2. The method of claim 1, wherein said FERPA protected information comprises one or more of grades, classes taken, grade point average, attendance history, standardized test scores, and certifications received.

3. The method of claim 1, wherein said opportunity is selected from the group consisting of: a job, admission to an academic institution, and enlistment in military service.

4. The method of claim 1, further comprising:
   receiving, at said provider computer, a message comprising a number of candidates in said plurality of candidates.

5. The method of claim 1, further comprising:
   determining, at said computer server; whether said number of candidates is at or above a predefined threshold;
   only if said computer server determines that said number of candidates is at or above said predefined threshold, said computer server transmitting to said provider computer a message comprising said number of candidates; and
   if said computer server determines that said number of candidates is not at or above said predefined threshold, said computer server does not transmit to said provider computer said message comprising said number of candidates.

6. The method of claim 1, further comprising:
   in response to receiving said copy of said communication comprising information about said opportunity, at least one candidate in said plurality of candidates manipulating a user interface of said candidate computer of said at least one candidate to draft a response message to said at least one provider;
   receiving, at said computer server, said at least one candidate response message;
   said computer server editing said at least one candidate response message to remove from said response message any personal information of said at least one candidate;
   said computer server transmitting said edited at least one candidate response message to said at least one provider; and
   receiving, at said at least one provider computer, said transmitted edited at least one candidate response.

7. The method of claim 6, wherein said computer server editing said at least one candidate response message to remove from said response message any personal information of said at least one candidate comprises replacing any text in said response message consisting of any candidate profile data for said at last one candidate with anonymized text.

8. The method of claim 6, wherein said at least one candidate response message includes image or video data, and said computer server editing said at least one candidate response message to remove from said response any personal information of said at least one candidate comprises anonymizing any portion of said image, or video data consisting essentially of any candidate profile data for said at least one candidate.

9. The method of claim 8, wherein said anonymizing comprises modifying said image or video data to blur, pixelate, or obscure said portion.

10. The method of claim 6, wherein said at least one candidate response message includes a digital file and said computer server editing said at least one candidate response message to remove from said response any personal information of said at least one candidate comprises removing from said digital file metadata comprising any candidate profile data for said at least one candidate.

11. The method of claim 1, wherein said receiving, at said computer server for each of said candidates, candidate profile data comprising information about said candidate comprises said computer server:
   causing to be displayed on said candidate computer for said each candidate one or more surveys comprising one of more survey questions; and
   collecting from said each candidate responses to each of said one of more survey questions of said one or more surveys.

12. The method of claim 1, further comprising:
   in response to receiving said copy of said communication comprising information about said opportunity, at least one candidate in said plurality of candidates manipulating a user interface of said candidate computer of said at least one candidate to initiate a chat session with said at least one provider.

13. The method of claim 12, wherein said initiating said chat session comprises:
displaying on a display of said candidate computer of said at least one candidate a chat interface updated in real-time with messages sent by said at least one provider to said at least one candidate; and
displaying on a display of said provider computer a chat interface updated in real-time with messages sent by said at least one candidate to said at least one provider;
wherein said provider computer does not receive personal information of said at least one candidate and said chat display of said provider computer does not display personal information of said at least one candidate.

14. The method of claim 13, further comprising:
for each chat message sent by said at least one candidate, receiving, at said computer server, said each chat message;
said computer server editing said each chat message to remove from said each chat message personal information of said at least one candidate;
said computer server transmitting said edited each chat message to said at least one provider;
receiving, at said provider computer, said transmitted edited each chat message; and
said displaying on a display of said provider computer a chat interface updated in real-time with messages sent by said at least one candidate to said at least one provider further comprising displaying on said display said received edited each chat message.

15. The method of claim 14, wherein said computer server editing said each chat message to remove from said each chat message personal information of said at least one candidate comprises replacing any text in said each chat message consisting of any candidate profile data for said at last one candidate with anonymized text.

16. The method of claim 14, wherein at least one message in said each chat message comprises image or video data, and said computer server editing said each chat message to remove from said each chat message personal information of said at least one candidate comprises anonymizing any portion of said image or image or video data consisting essentially of any candidate profile data for said at least one candidate.

17. The method of claim 14, wherein at least one message in said each chat message comprises a digital file, and said computer server editing said each chat message to remove from said each chat message personal information of said at least one candidate comprises removing from said digital file metadata comprising any candidate profile data for said at least one candidate.

18. The method of claim 1 wherein said candidate profile data is received, at least in part, from an educational institution.

19. The method of claim 1 wherein said candidate profile data is received, at least in part, from said candidate, said candidate being a student at an educational institution.

20. The method of claim 1 wherein said candidate profile data is received, at least in part, from a parent of said candidate, said candidate being a student at an educational institution.

\* \* \* \* \*